Aug. 6, 1968  M. F. GUY  3,395,655
INCINERATOR CONSTRUCTION
Filed Aug. 29, 1966  3 Sheets-Sheet 1
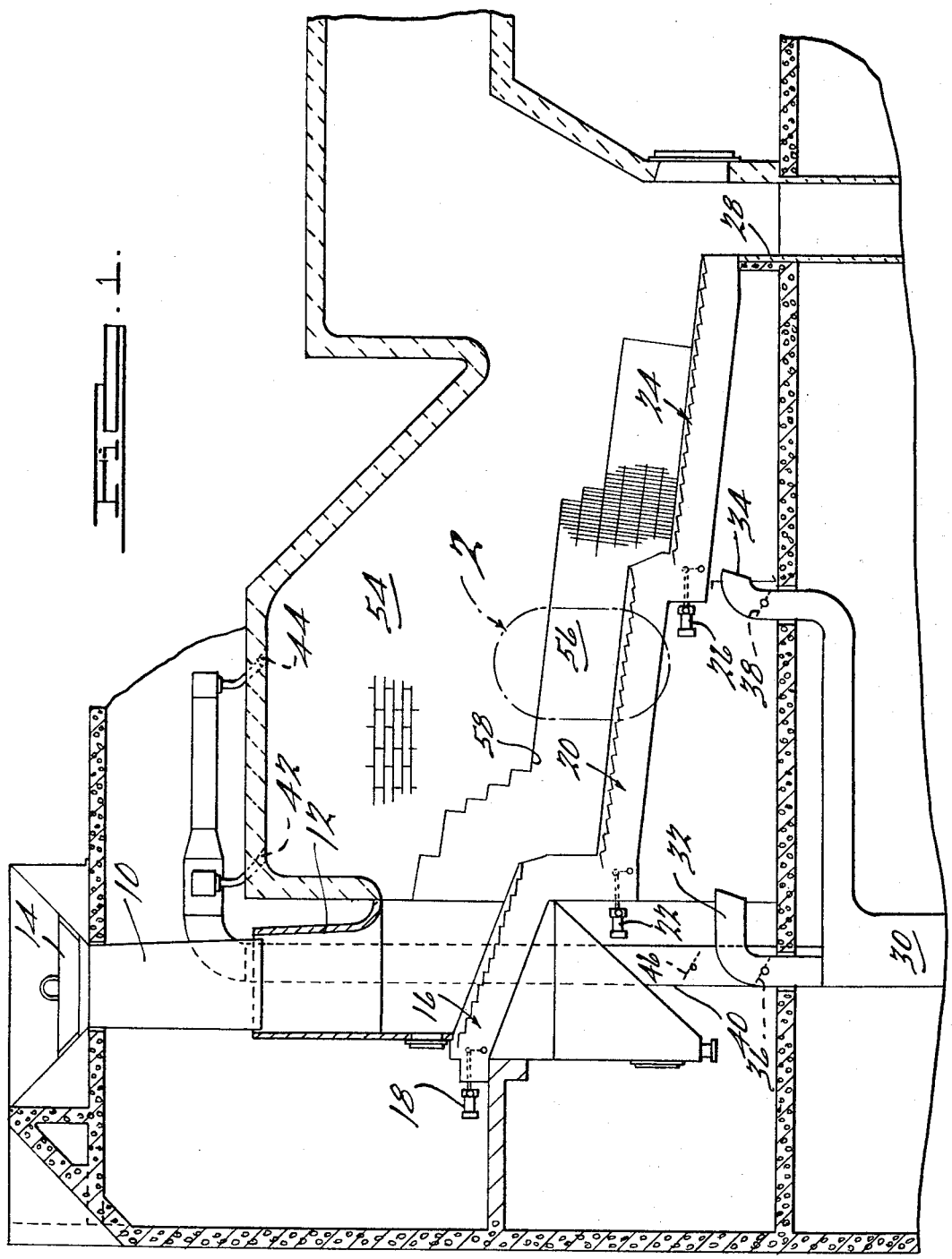
INVENTOR.
Milton F. Guy.
BY
Harness, Dickey & Pierce
ATTORNEYS Aug. 6, 1968  M. F. GUY  3,395,655
INCINERATOR CONSTRUCTION
Filed Aug. 29, 1966  3 Sheets-Sheet 2
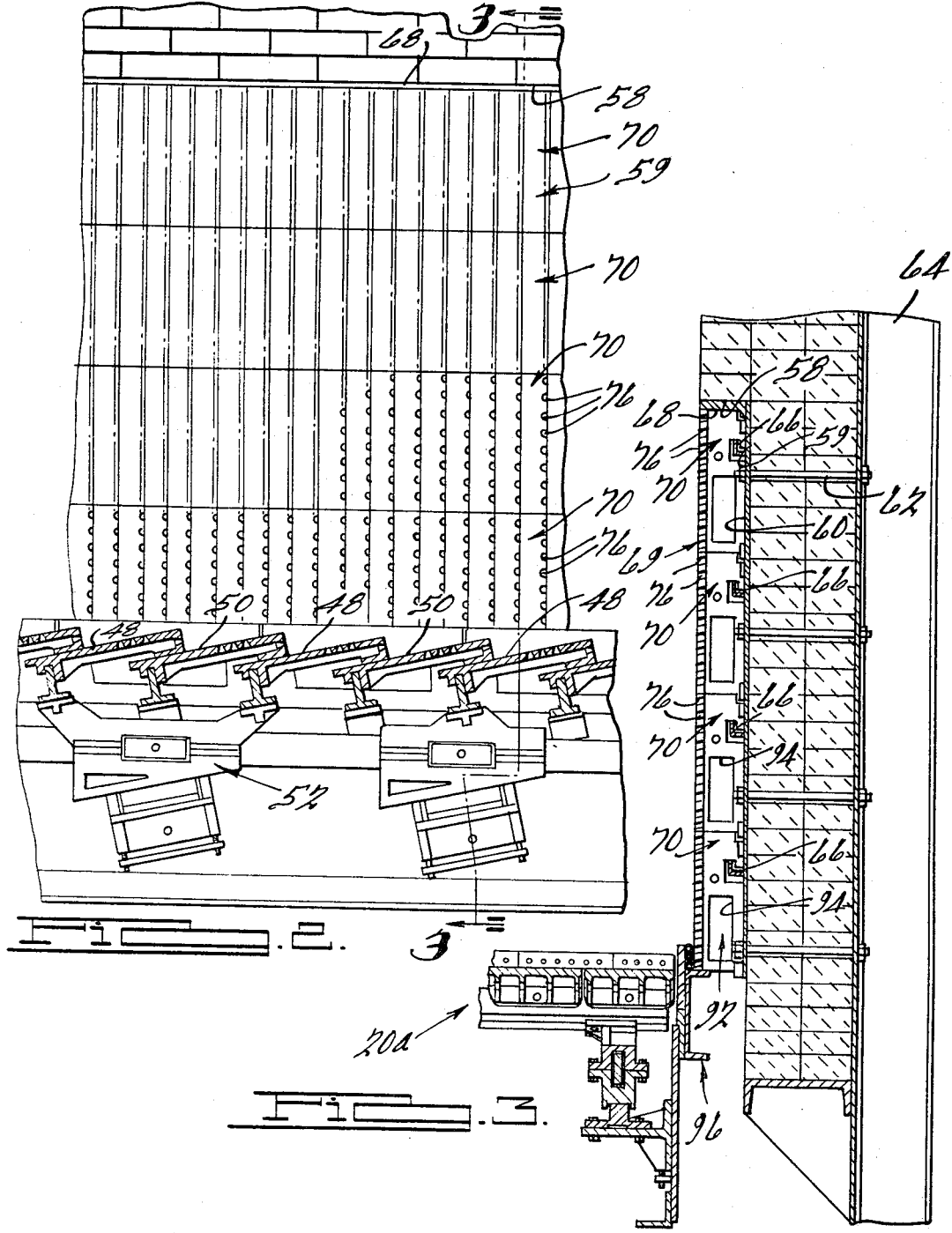
INVENTOR.
Milton F. Guy
BY
Hamess, Dickey & Pierce
ATTORNEYS

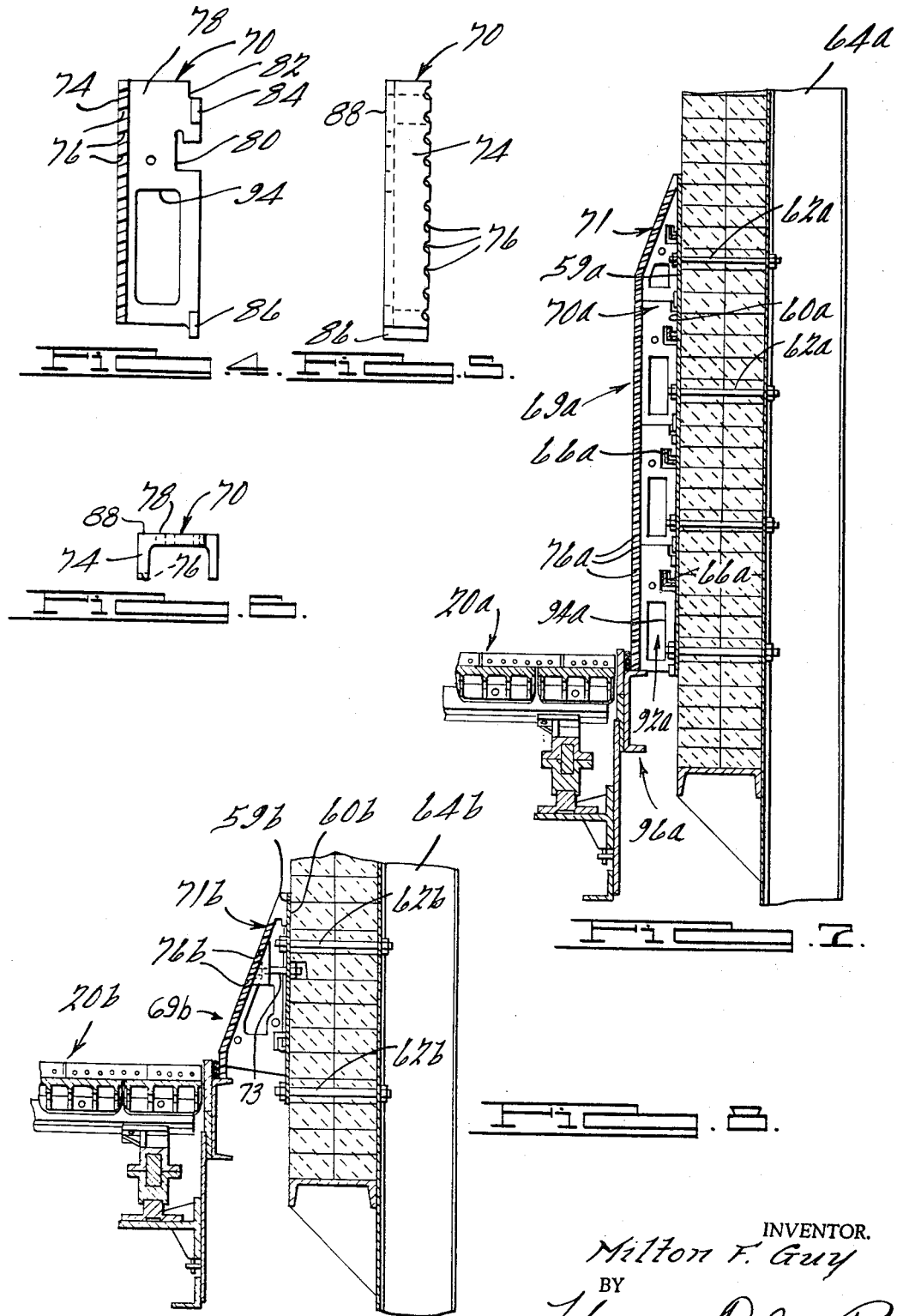

United States Patent Office 3,395,655
Patented Aug. 6, 1968

3,395,655
INCINERATOR CONSTRUCTION
Milton F. Guy, Grosse Isle, Mich., assignor to
Detroit Stoker Company
Filed Aug. 29, 1966, Ser. No. 575,772
23 Claims. (Cl. 110—15)

ABSTRACT OF THE DISCLOSURE

An incinerator construction having a tuyere side wall with air passages through the side wall to minimize formation of slag and clinkers.

The present invention relates to an incinerator construction, and more particularly to an incinerator construction for use in burning refuse and garbage.

Incinerators for burning refuse and garbage can be generally of the type as shown in United States Patent No. 3,126,846 to H. L. Wagner, issued Mar. 31, 1964. With such incinerators the garbage and refuse is fed into one end and is burned as it moves from one end of the incinerator to the other along a reciprocating grate structure. The grate structure is located between a pair of side walls which retain the garbage and refuse. In conventional structures, these side walls are made of a refractory material. It is common for the refuse and garbage to be piled to an initial depth of between three and four feet, with the depth decreasing as the refuse and garbage is burned as it is moved along the grate structure. Because of the substantial depth, it is difficult for air to reach the side walls and after the incinerator has been in operation for several hours the temperature of the walls adjacent the garbage and refuse becomes very high and the walls become incandescent. This high temperature, while aiding in the burning of the refuse, causes the ash in the residue to fuse resulting in the formation of side wall slag and clinkers. The slag and clinkers adhere to the side wall and project into the grate structure retarding the flow of garbage and refuse to the incinerator. When this builds up to a substantial extent, the incinerator must be shut down and the clinkers and slag removed from the side wall. In some operations it has been found that the slag and clinker cycle takes place in approximately eight hours of operation. It is an object of the present invention to provide an incinerator construction in which the formation of slag and clinkers along the side walls is minimized.

In general, the slag and clinker formation is minimized by supplying cooling air at the side walls whereby the side wall temperature is prevented from becoming excessive. Therefore, it is another object of the present invention to provide a novel incinerator structure utilizing air for cooling the side walls thereof.

Air for combustion of the garbage and refuse is fed from the bottom and top of the reciprocating grates and air from the same air supply is utilized in the area between the side wall and the garbage and refuse; this air not only provides cooling but also provides oxygen for combustion. Therefore, it is another object of the present invention to provide an incinerator construction in which formation of side wall slag and clinkers is minimized by cooling the side walls with air emanating from a central source supplying air generally for purposes of combustion.

It is a general object of the present invention to provide an incinerator having a novel and improved side wall construction. Other objects, features, and advantages of the present invention will become apparent from the subsequent description and the appended claims, taken in conjunction with the accompanying drawings, in which:

FIGURE 1 is a pictorial, partially diagrammatic, view of an incinerator structure embodying features of the present invention;

FIGURE 2 is an enlarged side elevational view of the portion of the incinerator structure of FIGURE 1 generally enclosed by the dotted lines indicated by the numeral 2;

FIGURE 3 is a sectional view taken generally along the line 3—3 in FIGURE 2;

FIGURE 4 is a side elevational view of one of the tuyeres making up a part of the side wall of the incinerator structure of FIGURES 1 through 3;

FIGURE 5 is a front elevational view of the tuyere of FIGURE 4;

FIGURE 6 is a top elevational view of the tuyere of FIGURE 4;

FIGURE 7 is a sectional view similar to that of FIGURE 3 and depicts a modified incinerator side wall construction; and FIGURE 8 is a sectional view similar to that of FIGURE 3 and depicts still another modified incinerator side wall construction.

Looking now to FIGURE 1, refuse is fed into the incinerator structure through chutes 10 aand 12 by removal of a cap 14 which encloses the top of the chute 10. The refuse is deposited upon the top of a reciprocating, feeder grate section 16 which is generally similar in construction to one of the grate sections shown in the above noted U.S. patent. The feeder grate 16 is downwardly inclined and can be reciprocably actuated by means of a cylinder 18 (diagrammatically shown) by which the refuse is fed downwardly along the feeder grate 16 onto an ignition grate 20. The input end of the ignition grate 20 is located a substantial distance below the outlet end of the feeder grate 16 whereby the refuse is tumbled and will tend to break apart as it is deposited onto the grate 20. Ignition grate 20 can be of a construction similar to that of grate 16 and can be reciprocably actuated by a cylinder 22. The refuse from the ignition grate 20 is deposited upon a burnout grate 24 which again is similar in construction to the ignition grate 20 and feed grate 16 and can be reciprocably actuated by means of a cylinder 26. The refuse at the end of the burnout grate 24 is deposited into an ash pit 28.

In the feed grate 16 the refuse is partially broken up and dried while in the ignition grate 20 and burnout grate 24, the refuse is burned. To facilitate combustion, the ignition grate 20 and burnout grate 24 are supplied with forced, draft air from a common source, generally indicated by the numeral 30. Air is inducted into the area below the ignition grate 20 by means of a duct 32 and into the area below the burnout grate 24 by means of a duct 34. The flow of air through ducts 32 and 34 can be controlled by dampers 36 and 38, respectively, and will pass through openings in the individual grate members whereby oxygen is made available for the combustion of the refuse. At the same time air from the source 30 is also forced upwardly through a duct 40 and out through a pair of nozzles 42 and 44 to supply air to the area above the ignition grate 20 and burnout grate 24 and hence to supply oxygen for the combustion of the refuse. The flow of air through the overhead duct 40 can be controlled by a damper 46.

The grates 16, 20 and 24 are constructed in a manner similar to that as shown in the above noted United States patent and generally comprise a plurality of flat movable grate members 48 which are located alternately and partially overlapping with flat stationary grate members 50. Pairs of the movable grate members 48 are connected together by an assembly indicated by the numeral 52 and can be reciprocated relatively thereby. Each of the grate members 48 and 50 is provided with apertures to permit the passage of air therethrough. The grates 16, 20 and 24 are enclosed generally by a pair of side walls with one such side wall being indicated by the numeral 54. The opposite side wall is of similar construction. These side walls are constructed with fire bricks made of a refractory material.

The side wall 54 has a portion 56 which is recessed in the area immediately adjacent the sides of the grate, i.e., looking to the drawing of FIGURE 1, the resultant recess or cavity 58 extends from a point approximately at the outlet of the feed grate 16 across the full length of the ignition grate 20 and to a point approximate the outlet end of the burnout grate 24. Along the vertical wall 59 of the cavity 58 is a steel support plate 60 which is fixed thereto by means of a plurality of bolt and nut assemblies 62 which can be connected to a beam support member 64. The steel support plate 60 has a plurality of vertically spaced horizontally extending angle iron members 66 located thereon and a cast iron top member 68 is located at the top of the upper end of the cavity 58. A vertical tuyere wall 69 is constructed in the cavity 58 by a plurality of vertical tuyeres which are similarly constructed and generally indicated by the numeral 70. The details of construction of the tuyeres 70 are shown in FIGURES 4 through 6. Each tuyere 70 has a front portion 74 which is provided, along one edge, with a plurality of grooves 76 which, when the tuyere 70 is mounted in place, define apertures which angle downwardly for a purpose to be described. The front portion 74 is connected to a side portion 78 which is provided at its rearward end with a notched construction 80 which can interfittingly receive the upper leg of the angle iron 66 whereby the tuyere 70 can be mounted thereon. The upper corner 82 of the side portion 78 above the notch 80 is cut away while its lower corner is provided with a leg 86 which extends partially below side portion 78 transversely and generally to the same extent as the front portion 74. A leg 84 extends transversely similarly to leg 86 and is located immediately below the upper corner 82. The tuyeres 70, as constructed, can be interfittingly mounted and hence when they are located side by side along a single one of the angle irons 66, the flat ungrooved edge 88 of one tuyere 70 is located adjacent the grooves 76 of another tuyere 70 to thereby define a plurality of apertures. When the tuyeres 70 are located one above each other on adjacent ones of the angle irons 66, the lower surface of the upper tuyere 70 is located proximate the upper surface of the lower tuyere 70 with the leg 86 of the upper tuyere 70 generally interfitting into the removed portion 82 and proximate to leg 84 of the lower tuyere 70. Note that the tuyeres 70 are supported substantially solely by the angle irons 66. The result is the compact wall structure 69.

The tuyeres 70 can be formed of cast iron and of a size compatible to that of standard firebrick. For example, a standard firebrick is 2½ inches high, 9 inches wide, and 4½ inches deep; the tuyeres 70 are made 12½ inches high, 2¼ inches wide, and 4¼ inches deep. Thus, the space occupied by five firebricks in height will accommodate four tuyeres in width. The difference in depths (¼ inch) accounts for the thickness of mounting plate 59. Hence, it is a simple matter to replace the firebrick in the desired area of the ceramic side wall and replace them with the tuyeres 70 as shown in FIGURES 4, 5 and 6. Note that the installation of the tuyeres 70 requires no special training and can be quickly accomplished. With the tuyeres 70 mounted upon adjacent ones of the angle iron 66 to define the tuyere wall 69, a vertical open column 92 is defined through which air can flow. At the same time each tuyere 70 is provided with an enlarged opening 94 in its side wall portion 78 whereby horizontal fluid communication is provided. Thus, free circulation of air along the tuyere wall 69 is assured. It can be seen from FIGURE 3 that the lower end of the tuyere wall 69 co-operates with a channel assembly 96 to generally close off the space between the grate and the bottom of the tuyere wall 69. The top plate 68 closes off the upper end of the wall 69. Since the area under the grate is being fed air by the duct 32 from the source 30, air will flow through the column 92 and generally through tuyere wall 69 and is directed through each of the openings defined by the grooves 76. With this construction air flows in the space immediately between the garbage and refuse being burned and the tuyere wall 69. In this way the temperature of the tuyere wall 69 is reduced and hence the formation of slag and clinkers is minimized and at the same time oxygen is provided for combustion. The tuyere wall 69 is formed only up to the necessary height which would be approximately the maximum depth expected of the garbage and refuse; however, when the depth of the refuse is below the top of the tuyere wall 69, air from the downwardly inclined grooves 76 above the refuse is directed down towards the refuse to supply oxygen for combustion. With such a construction it has been found that the formation of slag and clinkers on the side walls of an incinerator has been minimized and that operation can be maintained for a substantially greater period without shutdown.

For some incinerators the refractory side wall structure can be spaced from the grate. With such a construction a tuyere side wall 69a can be located in that space as shown in FIGURE 7. This construction is similar to that previously shown and described except that the terminating one of the tuyeres 71 is formed to have an inclined upper surface. In the construction shown in FIGURE 7, components similar to like components in the embodiment shown in FIGURES 1 through 6 are given the same numerical designations with the addition of the letter subscript "a"; note here that the tuyere wall 69a is air cooled and the formation of slag and clinkers is minimized.

FIGURE 8 shows still another embodiment in which only a single vertical tuyere row is used; in FIGURE 8 components similar to those shown in the embodiment of FIGURES 1 to 7 are given the same number with the addition of the letter subscript "b." The construction shown in FIGURE 8 is more commonly used for lighter duty and for units where the refractory side walls were originally installed down to the edge of the grate and corbeled outwardly directly above the grate. The refractory material directly above the grate is replaced by the tuyere side wall 69b which has vertical tuyeres 71b which are constructed similarly to tuyeres 71 with an upper sloping surface. In FIGURE 8 the tuyeres 71b are supported by bolts 73 which are secured to the support plate 60b. Again, with the construction shown in FIGURE 8, the tuyere wall 69b is air cooled and the formation of slag and clinkers is minimized.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An incinerator construction for burning refuse comprising: grate means for supporting and moving the refuse as it is burned, said grate means including a longitudinally extending grate structure, side wall means extending generally vertically from opposite sides of and generally longitudinally along said grate structure for retaining the refuse on said grate means, said side wall means including a lower wall portion located generally at the lower end of said side wall means and adjacent to said grate structure, and flow means for flowing air over said lower wall portion for cooling said lower wall portion whereby the formation of slag and clinkers is minimized, said side wall means in direct confrontation with said grate, excluding said lower wall portion, being constructed of firebrick and with said lower wall portion being constructed from a plurality of tuyeres, said lower wall portion comprising a support plate and support means for removably supporting said tuyeres on said support plate in a plurality of rows, at least some of said tuyeres having openings at the top, bottom and/or sides whereby said rows are in communication with vertically and/or horizontally extending fluid paths.

2. The incinerator of claim 1 with said lower wall portion being constructed from a plurality of cast iron tuyeres, said flow means comprising a plurality of first openings through said tuyeres, said tuyeres having vertical and lateral openings whereby generally all of said tuyeres are in fluid communication together.

3. The incinerator of claim 1 with said support plate being of a flat relatively thin construction, said support means comprising a longitudinally extending generally angled type member having a generally vertically extending leg portion with said tuyeres having a notch for receiving said leg portion.

4. The incinerator of claim 2 with each of said tuyeres having a plurality of grooves along one edge with said grooves defining said first openings.

5. The incinerator of claim 1 with said support plate being of a flat relatively thin construction, said support means comprising a longitudinally extending generally angled type member having a generally vertically extending leg portion with said tuyeres having a notch for receiving said leg portion.

6. The incinerator of claim 5 with said tuyeres having said notch at its rearward end and having a plurality of openings at its forward end with said flow means including said openings.

7. An incinerator construction for burning refuse comprising: grate means for supporting and moving the refuse as it is burned, said grate means including a longitudinally extending grate structure, side wall means extending generally vertically from opposite sides of and generally longitudinally along said grate structure for retaining the refuse on said grate means, said side wall means including a lower wall portion located generally at the lower end of said wall means and adjacent to said grate structure, and flow means for flowing air over said lower wall portion for cooling said lower wall portion whereby the formation of slag and clinkers in minimized, said side wall means in direct confrontation with said grate excluding said lower wall portion, being constructed of firebrick and with said lower wall portion being constructed from a plurality of tuyeres, said lower wall portion comprising a support plate and support means for removably supporting said tuyeres on said support plate, said side wall means being generally spaced from the sides of said grate means and with said lower wall portion comprising a horizontal row, one tuyere high, of said tuyeres extending outwardly from the remainder of said side wall means and generally proximate to said grate means; said tuyeres having a front surface being sloped downwardly from said remainder of said side wall means, at least some of said tuyeres having openings at the sides whereby said row is in communication with a horizontally extending fluid path.

8. The incinerator of claim 7 with said flow means comprising a plurality of downwardly inclined grooves located along one edge of said front surface.

9. The incinerator of claim 8 with said flow means comprising a plurality of passages through said lower wall portion with said tuyeres being opened at the bottom and having a transverse passageway therethrough for intercommunicating said tuyeres, said passages comprising said passageway and the opening at the bottom of said tuyeres and communicating with said grooves.

10. The incinerator of claim 9 with said flow means including means connected to a source of forced air with said source supplying air at the top and bottom of said grate means for combustion of the refuse.

11. The incinerator of claim 1 with said lower wall portion being located in a cavity in said side wall means and being substantially flush with the remainder of said side wall means, and with said tuyeres having a preselected height, depth and width whereby a selected number of said tuyeres will occupy the same space as a whole number of said firebrick.

12. The incinerator of claim 1 with said side wall means being generally spaced from the sides of said grate means end with said lower wall portion extending outwardly from the remainder of said side wall means and generally proximate to said grate means.

13. The incinerator of claim 12 with said support plate being of a flat relatively thin construction, said support means comprising a longitudinally extending generally angled type member having a generally vertically extending leg portion with said tuyeres having a notch for receiving said leg portion.

14. The incinerator of claim 13 with the uppermost one of said tuyeres having an outer surface being sloped downwardly from said remainder of said side wall means.

15. An incinerator construction for burning refuse comprising: grate means for supporting and moving the refuse as it is burned, said grate means including a longitudinally extending grate structure, side wall means extending generally vertically from opposite sides of and generally longitudinally along said grate structure for retaining the refuse on said grate means, said side wall means including a lower wall portion located generally at the lower end of said side wall means and adjacent to said grate structure, and flow means for flowing air over said lower wall portion for cooling said lower wall portion whereby the formation of slag and clinkers is minimized, said lower wall portion being constructed from a plurality of tuyeres and with each of said tuyeres having a front surface portion and a side portion, said side portion having a notch at its rearward end and having a pair of transversely extending leg portions one above said notch and another at the lower end of said side portion, said side portion being cut away at its upper corner, said other leg portion extending below the remainder of said each of said tuyere whereby with said tuyeres vertically stacked said other leg portion of an upper one will fit into said cutaway of the next lower one.

16. The incinerator of claim 15 with said flow means comprising a plurality of downwardly inclined grooves located along the edge of said front surface portion.

17. The incinerator of claim 16 with said flow means comprising a plurality of passages through said lower wall portion with at least some of said tuyeres being opened at the top and bottom and having an aperture through said side wall portion, said passages comprising the openings at the bottom and top of said some of said tuyeres and said aperture and communicating with said grooves.

18. The incinerator of claim 17 with said support means comprising a longitudinally extending member having a generally vertically extending leg portion locatable in said notch for supporting said tuyere.

19. The incinerator of claim 18 with said downwardly inclined grooves being located along the edge of said front surface portion opposite from said side portion.

20. The incinerator of claim 19 with said side wall means excluding said lower wall portion being constructed of firebrick and with said lower wall portion being constructed from a plurality of tuyeres with said tuyeres having a preselected height, depth and width whereby a selected number of said tuyeres will occupy the same space as a whole number of said firebrick.

21. The incinerator of claim 18 with said flow means including means connected to a source of forced air with said source supplying air at the top and bottom of said grate means for combustion of the refuse.

22. The incinerator of claim 21 with said side wall means excluding said lower wall portion being constructed of firebrick and with said lower wall portion being constructed from a plurality of tuyeres with said tuyeres having a preselected height, depth and width whereby a selected number of said tuyeres will occupy the same space as a whole number of said firebrick.

23. The incinerator of claim 22 with said lower wall portion being located in a cavity in said side wall means and being substantially flush with the remainder of said side wall means.

References Cited
UNITED STATES PATENTS

| | | | |
|---|---|---|---|
| 1,085,445 | 1/1914 | Leask | 110—8 X |
| 1,601,909 | 10/1926 | Drake et al. | 110—75 |
| 1,627,349 | 5/1927 | Snow | 110—75 |
| 1,955,996 | 4/1934 | Wynne et al. | 110—75 |
| 1,974,143 | 9/1934 | Spencer | 110—75 |
| 3,317,202 | 5/1967 | Gates et al. | 110—15 |

JAMES W. WESTHAVER, *Primary Examiner.*